Jan. 28, 1969  O. J. ADLHART ET AL  3,424,619
PROCESS FOR USING FUEL CELL WITH HYDROCARBON
FUEL AND PLATINUM-NIOBIUM ALLOY CATALYST
Filed Sept. 28, 1964

INVENTORS
Otto J. Adlhart
BY Keith O. Hever

ATTORNEY 3,424,619
Patented Jan. 28, 1969

3,424,619
PROCESS FOR USING FUEL CELL WITH HYDROCARBON FUEL AND PLATINUM-NIOBIUM ALLOY CATALYST
Otto J. Adlhart, Newark, N.J., and Keith O. Hever, Dearborn, Mich., assignors to Engelhard Industries, Inc., Newark, N.J., a corporation of Delaware
Filed Sept. 28, 1964, Ser. No. 399,534
U.S. Cl. 136—86                    6 Claims
Int. Cl. H01m 27/10

ABSTRACT OF THE DISCLOSURE

This disclosure pertains to a fuel cell using hydrocarbons as fuel and an alloy of platinum and niobium as anode catalyst. This alloy catalyst permits less polarization and greater efficiency than would ordinarily be expected.

---

Figure 1:
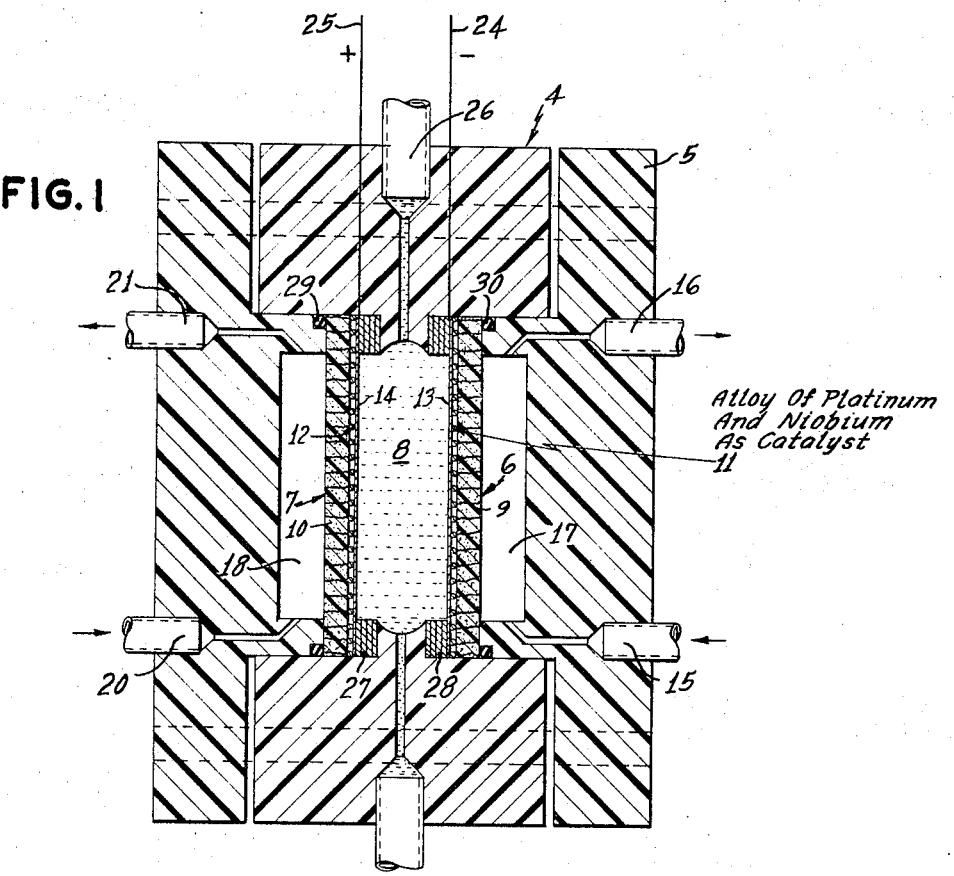

This invention relates to fuel cells and more especially to fuel cells equipped with new and improved fuel electrodes, the fuel electrode per se, and the production of electrical energy utilizing such fuel cells.

Fuel cells are well known as devices for the direct conversion of the chemical energy of a fuel into electrical energy. The cells basically are composed of an oxidizer electrode or cathode, a fuel electrode or anode, and an electrolyte. The terms "oxidizer electrode" and "cathode" are used interchangeably herein as are the terms "fuel electrode" and "anode."

When operating a fuel cell employing, for instance, a gaseous organic fuel and an acid electrolyte, the gaseous fuel is passed into the interior of a porous gas diffusion anode to the interface formed by the anode and the electrolyte. A catalyst also present at such interface or juncture promotes the electrochemical reaction of the fuel with release of electrons to the anode surface, which electrons are drained off through an external circuit. An oxidizer, for instance an oxidizing gas, e.g. oxygen, is passed into the interior of a porous gas diffusion cathode to the interface formed by the cathode and electrolyte. A catalyst is also present at such interface or juncture and promotes the electrochemical ionization of the oxygen. The negatively charged ions formed at the cathode neutralize the protons formed at the anode.

Platinum has been utilized heretofore as catalyst at the anode in fuel cells using acid electrolyte. We have employed platinum as anode catalyst and while platinum has given satisfactory results as such catalyst, nevertheless there was room for improvement from the standpoint of obtaining higher voltages. Further, platinum is one of the most expensive of the precious metals and to provide the art with an anode catalyst achieving superior results as compared to the platinum and which is appreciably less expensive than the platinum would be particularly of merit.

In accordance with the present invention, we have found that anode potentials are attained during cell operation which are superior to those provided by cell anodes having platinum per se as catalyst and with a material as anode catalyst which is appreciably less expensive than the platinum per se. The new and improved catalytic anode of this invention comprises as catalyst an alloy of platinum and niobium. By reason of the superior anode potentials provided by this invention, there is achieved an improved performance of the fuel cell with an increased cell efficiency and materially higher power output thereof.

The anode catalyst of this invention can be either unsupported or supported on a suitable substrate. When unsupported, it can be in the form of a porous self-sustaining disc or sheet or of another desired shape formed by compacting a mass of the alloy particles in a die with application of pressure. Thereafter the compact is preferably sintered to impart strength thereto. When supported, the alloy can be applied and adhered to the surface of porous metallic structures such as, for instance, porous metallic sheets or grids or porous non-metallic structures such as, for instance, porous discs or sheets of carbon, graphite or plastics. The supported cathode catalyst can also be prepared by mixing together the catalyst and carrier or support in the form of powders, followed by application of pressure, and preferably then sintering the compact.

The cathode is preferably also a catalytic cathode. The catalyst for the cathode is, for example, platinum or palladium. The catalytic cathode can also be a self-sustaining unsupported cathode or a supported catalytic cathode, with either type prepared in similar manner as the unsupported or supported catalytic anode.

The process for production of electrical energy in accordance with this invention comprises, in its broader aspects, contacting a catalytic anode of a fuel cell with an organic fuel with the anode catalyst comprising essentially an alloy of platinum and niobium, and contacting the cathode of the cell with a fuel. The anode and cathode are each in contact with an acid electrolyte. Consequently the fuel reacts electrochemically at the anode with release of electrons which are carried off by an electronically conductive member of an external circuit, and the oxidizer reacts electrochemically at the cathode with the electrons supplied from the external circuit, so that a continuous electric current results.

The oxidizer, for instance an oxidizing gas, is contacted with the electrolyte and catalyst by passage within a gas-pervious cathode of this invention.

The fuel, for instance a normally gaseous straight chain hydrocarbon, is contacted in gaseous or vapor phase with the electrolyte by passage within a gas-pervious anode.

The platinum-niobium alloy of this invention can be prepared by melting such two metals in proportions corresponding to that desired in the product alloy together with a third component, capable of being readily leached out of the resulting alloy, for instance aluminum or silicon. The melting of the three components can be done in a gas-fired or electrical furnace. The resulting alloy, after removal from the furnace and cooling solidification, is treated with caustic, for instance by immersion in potassium hydroxide or sodium hydroxide aqueous solution of, for instance, 10% caustic concentration, to dissolve out the aluminum or silicon. If desired the leaching can be effected by treatment with acid. The resulting binary or substantially binary alloy is obtained as a powder. In this preparation method the aluminum or silicon is usually present in major amount, with the platinum and niobium present in minor amount. Thus a typical alloy prior to the leaching contains, by weight, 85% aluminum or silicon and 15% total platinum and niobium. In the 15% total platinum and niobium, the platinum is preferably present in amount, by weight, of 50%–98% with the balance niobium.

In a specific embodiment for preparing the supported alloy catalyst, the platinum-niobium alloy prepared by the method hereinbefore disclosed is applied and adhered in powder form to the support. With a support such as a sheet of porous "Teflon," the alloy powder particles are pressed into the surface of the "Teflon" at normal temperature by means of a suitable press, for instance a hydraulic press, thereby to adhere to the support.

The fuel herein is a normally gaseous or liquid hydrocarbon, for instance $C_1$–$C_{20}$ straight chain alkane hydrocarbons, e.g. methane, ethane, propane, butane, pentane, hexane, heptane, nonane, decane and so forth, a hydrocarbon distillate fraction obtained from the fractional distillation of petroleum and boiling at atmospheric pressure in the range of 30° C. to 400° C., and mixtures of such normally liquid and normally gaseous hydrocarbons.

The platinum-niobium alloys of this invention preferably contain, by weight, from about 50%–98% of platinum and the balance niobium, i.e. 50%–2% of niobium.

The electrolyte herein is an acid electrolyte, for instance an aqueous sulfuric acid solution, e.g. aqueous sulfuric acid solution of 5% to 40% by weight concentration, or aqueous phosphoric acid of 60% to 100% by weight concentration.

The fuel cells of this invention may be operated at ambient conditions but preferably are operated at elevated temperatures in the range of about 50° C.–200 °C. Sufficient heat for operation of the cells is usually provided by some polarization unavoidably occurring therein. Heat can be supplied from an outside source for start-up and, if necessary, during the course of the cell operation, for instance by steam supplied to a suitable steam jacket. The temperature of the cell may be controlled, for instance, by circulation of cooling air or other cooling gas about the cell, or by use of a predetermined amount of thermal insulation material about the cell.

Figure 2:
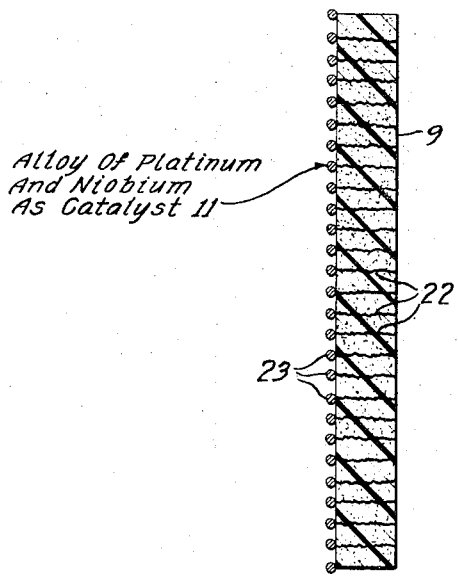

Reference is now made to the accompanying drawings wherein:

FIGURE 1 is a schematic longitudinal sectional view of a fuel cell of this invention; and FIGURE 2 is an enlarged schematic sectional view of a fuel electrode of this invention.

Referring to FIGURE 1, fuel cell 4 comprises container 5 of "Teflon" or other material of low electrical conductivity, electrodes 6 and 7 of opposing polarity therein and respectively the anode and cathode and liquid electrolyte 8 contacting opposed surfaces of electrodes 6 and 7. Anode and cathode 6 and 7 respectively are each made up of a porous substrate or support 9 and 10 of low electrical conductivity, for instance a sheet of porous "Teflon" sponge. Anode 6 is gas pervious and has permeable catalyst layer 11 of a binary of substantially binary alloy of this invention of essentially platinum and niobium adhered to the support, and gas pervious cathode 7 also has a permeable catalyst layer 12 of platinum black adhered to the support. In addition to the catalyst being adhered to the exterior surface of supports 9 and 10 of electrodes 6 and 7, some of the catalyst is on the walls defining accessible pores of the porous supports 9 and 10. A three-phase contacting of catalyst, electrolyte and gaseous fuel results in the pores of substrate 9 of anode 6, where the catalyst contacts the interface or juncture of the electrolyte and gaseous fuel. Electrically conductive members 13 and 14, for instance single ply platinum gauze sheets, are in face to face contact with catalyst layers 11 and 12 on supports 9 and 10 respectively. The connection to the conventional reference electrode (not shown) is designated at 26. Annular members 27 and 28 of gold and O-rings 29 and 30 of neoprene rubber serve to respectively maintain the gauze sheets 14 and 13 in contact with the catalyst layers, and to seal the assembly. When a self-sustaining, unsupported porous shape of catalytic metal, for instance the self-sustaining porous plate or sheet of catalytic metal is employed as anode and/or cathode, the electrically conductive members 13 and/or 14 may be dispensed with. In this event a suitably electrically conductive member, for instance a conductive wire or strip, of the external circuit need contact only a portion of each of the conductive anode and/or cathode and usually an end portion thereof.

Fuel inlet and outlet 15 and 16 respectively enable respectively continuous supply of the fuel in gaseous form into anode compartment 17 and the outflow of gaseous reaction products from such compartment. The gaseous fuel, for instance propane gas, diffuses into the interior of porous gas diffusion anode 6 to the interface formed by the anode and the electrolyte. When the fuel is a normally liquid hydrocarbon, it is vaporized prior to being supplied into anode compartment 17 and gas diffusion anode 6. The catalyst also present at such interface or juncture promotes the release of electrons to the anode surface and such electrons are drained off through an external circuit.

An oxidizing gas, for instance oxygen per se, is continuously supplied into cathode compartment 18 through inlet 20 and the cathode effluent evolves through outlet 21. The oxygen gas diffuses into the interior of porous gas diffusion cathode 7 to the interface formed by the cathode and electrolyte. A catalyst, e.g. platinum, present at such interface or juncture promotes the electrochemical ionization of the oxygen, and the negatively charged ions formed at the cathode neutralize the protons formed at the anode. Exemplary of other oxidizers utilizable hereing in place of oxygen per se is air.

One anode of this invention is shown in more detail in FIGURE 2. Pores 22 of porous support sheet 9 of low electrical conductivity, for instance of "Teflon" sponge, communicate opposite sides of the support. The alloy catalyst of this invention is supported on substarte 9 as a permeable layer 11 of powder particles 23 with the catalyst particles also on the walls defining the accessible pores in the interior of the porous support 9, as previously disclosed herein. An electrically conductive member such as the platinum gauze sheet 13 shown in FIGURE 1 will be secured in face to face contact with catalyst layer 11 for draining off electrons from the catalyst.

Electrically conductive elements 24 and 25 are connected to the upper portion of the platinum gauze current collectors 13 and 14 respectively. Conductive elements 24 and 25 are connected in an external circuit with a suitable resistance, for instance an incandescent lamp (not shown), and the flow of current in such circuit due to the flow of electrons resulting from the electrochemical reaction within the fuel cell, results in the lamp being energized and lighting up.

The invention is further illustrated by reference to the following example. A number of different materials were tested and evaluated as anode catalyst by a half cell evaluation procedure. The platinum-niobium alloys of this invention were tested as anode catalysts for fuel cells as set forth in the example which follows, and compared with platinum per se as anode catalyst by such evaluation procedure. Such procedure is especially convenient for rapid and unambiguous determination of differences in anode polarization, as any limitations due to cathode polarization or resistance polarization are eliminated. Such a half cell evaluation procedure is described in J. Electrochem. Soc. 109, 553 (1962).

The fuel supplied to the catalytic anode of the cell was propane gas. The electrolyte was aqueous phosphoric acid of 85% acid concentration, and the electrolyte was maintained at a temperature of about 150° C. by an oil bath. The cell was operated under a pressure of 100 p.s.i.g. The anodes were prepared by mixing 200 mg. of fine particulate catalytic metal passing a 400 mesh sieve with 100 mg. of "Teflon" powder passing a 50 mesh screen, followed by a pressing the mix at 20 p.s.i. with a hydraulic press onto the surface of a porous sheet of "Teflon" sponge. The resulting electrodes were then pretreated with hydrogen for about ten minutes, the hydrogen being generated on the anode by passing an electrical current through the cell at a current density of about 50 ma./cm.$^2$. The following results were obtained:

| Test run | Composition of anode catalyst (percent by weight) | Potential in millivolts vs. AgCl/Ag reference electrode at indicated current density in ma./cm.$^2$ | | | | | |
|---|---|---|---|---|---|---|---|
| | | 0 | 5 | 10 | 20 | 30 | 50 |
| 1 | Alloy of 30% Nb–70% Pt | 100 | 130 | 150 | 200 | 240 | 300 |
| 2 | Pt alone | 90 | 240 | 280 | 340 | 380 | 430 |
| 3 | Alloy of 20% Ni–80% Pt | 130 | 230 | 275 | 335 | 390 | 460 |
| 4 | Alloy of 33% Ti–67% Pt | 140 | 260 | 310 | 380 | 430 | 540 |
| 5 | Alloy of 20% Mn–80% Pt | 130 | 235 | 280 | 330 | 370 | 450 |

The data of the foregoing table show the superiority of the alloys of platinum and niobium as anode catalyst (Test Run 1), over the platinum alone (Test Run 2) during current withdrawal, and over alloys of Pt with other metals (Test Runs 3–5) as such catalyst both during current withdrawal and at open circuit.

What is claimed is:

1. A process for the production of electrical energy, which comprises contacting a catalytic anode of a fuel cell with a hydrocarbon as fuel, the catalyst being an alloy containing essentially 50–90% of platinum and the balance niobium, the anode being in contact with an acid electrolyte, and contacting a cathode of the cell with an oxidizer, the cathode also being in contact with the electrolyte.

2. The process of claim 1 wherein the fuel is a normally gaseous hydrocarbon.

3. The process of claim 1 wherein the fuel is a normally liquid hydrocarbon.

4. The process of claim 1 wherein the fuel is a $C_1$–$C_{20}$ straight chain alkane hydrocarbon.

5. The process of claim 1 wherein the oxidizer is an oxidizing gas.

6. The process of claim 1 wherein the cell is operated at a temperature in the range of about 50° C.–200° C.

References Cited

UNITED STATES PATENTS

| 3,134,697 | 5/1964 | Niedrach | 136—86 |
| 3,190,749 | 6/1965 | Fleming | 75—134 |
| 3,239,382 | 3/1966 | Thompson | 136—86 |
| 3,274,031 | 9/1966 | Maget et al. | 136—86 |
| 3,291,642 | 12/1966 | Jung et al. | 136—86 |
| 3,328,204 | 6/1967 | Grubb | 136—86 |

FOREIGN PATENTS 887,326   1/1962   Great Britain.

ALLEN B. CURTIS, *Primary Examiner.*

U.S. Cl. X.R.

75—134, 172; 136—120

UNITED STATES PATENT OFFICE
CERTIFICATE OF CORRECTION

Patent No. 3,424,619                                            January 28, 1969

Otto J. Adlhart et al.

It is certified that error appears in the above identified patent and that said Letters Patent are hereby corrected as shown below:

Column 5, line 29, "essentially 50-90% of platinum" should read -- essentially 50-98% of platinum --.

Signed and sealed this 17th day of March 1970.

(SEAL)
Attest:

Edward M. Fletcher, Jr.                        WILLIAM E. SCHUYLER, JR.
Attesting Officer                                     Commissioner of Patents